United States Patent
Yang et al.

(10) Patent No.: US 10,891,275 B2
(45) Date of Patent: Jan. 12, 2021

(54) LIMITED DATA ENRICHER

(71) Applicant: INTERNATIONAL BUSINESS MACHINES CORPORATION, Armonk, NY (US)

(72) Inventors: Hyuna Yang, Somerville, MA (US); Gigi Y. C. Yuen-Reed, Tampa, FL (US); Yajuan Wang, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 305 days.

(21) Appl. No.: 15/854,038

(22) Filed: Dec. 26, 2017

(65) Prior Publication Data

US 2019/0197139 A1 Jun. 27, 2019

(51) Int. Cl.
| | | |
|---|---|---|
| G06F 17/00 | (2019.01) | |
| G06F 16/215 | (2019.01) | |
| G06F 16/22 | (2019.01) | |
| G06F 16/21 | (2019.01) | |
| G06N 5/04 | (2006.01) | |

(52) U.S. Cl.
CPC .......... *G06F 16/215* (2019.01); *G06F 16/212* (2019.01); *G06F 16/22* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 2003/0120651 A1* | 6/2003 | Bernstein | G06F 16/86 |
| 2003/0126102 A1* | 7/2003 | Borthwick | G16H 10/60 |
| | | | 706/21 |
| 2005/0261940 A1* | 11/2005 | Gay | G06Q 50/24 |
| | | | 705/3 |
| 2008/0126131 A1* | 5/2008 | Lou | G06F 19/3456 |
| | | | 705/3 |
| 2009/0123439 A1* | 5/2009 | Yun | C12Q 1/6886 |
| | | | 424/93.21 |
| 2014/0074829 A1* | 3/2014 | Schmidt | G06F 16/248 |
| | | | 707/723 |
| 2014/0172870 A1* | 6/2014 | Wang | G16H 50/70 |
| | | | 707/741 |
| 2016/0000726 A1* | 1/2016 | Li | A61K 9/5169 |
| | | | 424/490 |
| 2016/0140362 A1* | 5/2016 | Aghili | H04W 4/60 |
| | | | 726/29 |

(Continued)

*Primary Examiner* — Hasanul Mobin
(74) *Attorney, Agent, or Firm* — Kristofer L. Haggerty

(57) ABSTRACT

Embodiments of the present invention disclose a method, a computer program product, and a computer system for enriching data. A computer receives a limited dataset and a target insight. In addition, the computer identifies an applicable richer dataset and determines a population relatedness between the limited dataset and the applicable richer dataset. Moreover, the computer calculates estimators of features using the richer dataset as well as calculates estimators for features using the limited dataset. The computer then updates the estimators of the limited dataset using estimators of the richer dataset and evaluates the updated estimators. Lastly, the computer provides a data collection recommendation as it relates to the limited dataset based on the evaluation.

20 Claims, 7 Drawing Sheets

(56) References Cited

U.S. PATENT DOCUMENTS

| | | | |
|---|---|---|---|
| 2016/0213266 A1* | 7/2016 | Fuke | A61B 5/0004 |
| 2016/0321748 A1* | 11/2016 | Mahatma | G06Q 40/04 |
| 2017/0165425 A9* | 6/2017 | Ruchti | G16H 50/20 |
| 2017/0323384 A1* | 11/2017 | Dintenfass | G06F 21/6245 |
| 2018/0253658 A1* | 9/2018 | Baran | G06Q 50/01 |

* cited by examiner

LIMITED DATA ENRICHER

BACKGROUND

The present invention relates generally to data analysis, and more particularly to enriching limited data sets using richer data sets.

Healthcare data is typically collected to serve a certain purpose, and thus only features relevant to the purpose are collected. For instance, Electronic Medical Record (EMR) data typically collects features related to clinical activity while claim data collects features relevant to administrative or financial transactions. As time goes on, one can find additional features relevant to the purpose, however collecting these additional features can be expensive. One may need new machine and/or employee training to collect new information, or need to additionally change the data collection process. For example, a data collection protocol, database architecture, storage space, etc. may need be changed or updated in order to collect the new features. Thus to collect additional features, one needs to assure that the benefit is greater than the cost.

SUMMARY

Embodiments of the present invention disclose a method, a computer program product, and a computer system for enriching limited data using richer data.

According to some embodiments, the method includes a computer receiving a limited dataset and a rich dataset, wherein the limited dataset details one or more limited features, and wherein the rich dataset details the one or more limited features and at least one additional feature. In such embodiments, the method may further include the computer determining one or more first feature estimators corresponding to the one or more limited features based on the limited dataset and the computer determining one or more second feature estimators corresponding to the one or more limited features and the at least one additional feature based on the richer dataset.

In some embodiments, the method further comprises the computer updating the one or more first feature estimators based on the one or more second feature estimators, the computer evaluating the updated one or more first feature estimators with regard to a target insight, and the computer providing a feature collection recommendation based on the evaluation.

In other embodiments of the method, evaluating the updated one or more first feature estimators further comprises determining a first effect on the target insight based on applying a model having the one or more first feature estimators to the limited dataset, determining a second effect on the target insight based on applying a model having the one or more second feature estimators to the limited dataset, and comparing the first effect on the target insight to the second effect on the target insight.

According to some embodiments, the method may further comprise determining that the limited dataset lacks a corresponding value to apply the model having the one or more second feature estimators, imputing the corresponding value, and applying the model having the one or more second feature estimators to the limited dataset.

Moreover, in some embodiments, the feature collection recommendation includes at least one of one or more of the at least one additional feature for inclusion in the limited dataset and an amount of data to be collected corresponding to the one or more of the at least one additional feature. In further embodiments, the feature collection recommendation includes the second effect on the target insight.

In addition, and according to one embodiment, receiving the limited dataset and the rich dataset further comprises determining a population relatedness between the limited dataset and one or more candidate richer datasets, then receiving a selection of the rich dataset of the one or more candidate richer datasets.

According to other embodiments, updating the one or more first feature estimators based on the one or more second feature estimators further comprises at least one of replacing the one or more first feature estimators with the one or more second feature estimators, replacing the one or more first feature estimators based on an average of the one or more first feature estimators and the one or more second feature estimators, and replacing the one or more first feature estimators based on a weighted average of the one or more first feature estimators and the one or more second feature estimators.

According to another embodiment of the present invention, a computer program product is disclosed. The computer program product includes one or more computer-readable storage devices and program instructions stored on at least one of the one or more tangible storage devices.

In addition, the computer program product includes program instructions comprising program instructions to receive a limited dataset and a rich dataset, wherein the limited dataset details one or more limited features, and wherein the rich dataset details the one or more limited features and at least one additional feature. In addition, the computer program product further comprises program instructions to determine one or more first feature estimators corresponding to the one or more limited features based on the limited dataset and one or more second feature estimators corresponding to the one or more limited features and the at least one additional feature based on the richer dataset.

In embodiments, the computer program product further includes program instructions to update the one or more first feature estimators based on the one or more second feature estimators, program instructions to evaluate the one or more updated first feature estimators with regard to a target insight, and program instructions to provide a feature collection recommendation based on the evaluation.

According to some embodiments, the program instructions to evaluate the updated one or more first feature estimators further comprise program instructions to determine a first effect on the target insight based on applying the one or more first feature estimators to the limited dataset, program instructions to determine a second effect on the target insight based on applying the one or more second feature estimators to the limited dataset, and program instructions to compare the first effect on the target insight to the second effect on the target insight.

In other embodiments, the computer program product further includes program instructions to determine that the limited dataset lacks a corresponding value to apply the one or more second feature estimators, program instructions to impute the corresponding value; and program instructions to apply the model having the one or more second feature estimators to the limited dataset.

In some embodiments, the feature collection recommendation includes at least one of one or more of the at least one additional feature for inclusion in the limited dataset, and an amount of data to be collected corresponding to the one or more of the at least one additional feature. In further embodiments, the feature collection recommendation further includes the second effect on the target insight.

According to another embodiment, the program instructions to receive the limited dataset and the rich dataset further comprise program instructions to determine a population relatedness between the limited dataset and one or more candidate richer datasets, and program instructions to receive a selection of the rich dataset of the one or more candidate richer datasets.

Moreover, in other embodiments, the program instructions to update the one or more first estimators based on the one or more second estimators further comprise at least one of program instructions to replace the one or more first estimators with the one or more second estimators, program instructions to replace the one or more first estimators based on an average of the one or more first estimators and the one or more second estimators, and program instructions to replace the one or more first estimators based on a weighted average of the one or more first estimators and the one or more second estimators.

Additionally disclosed is a computer system for enriching data, wherein the computer system comprises one or more processors, one or more computer-readable memories, one or more computer-readable tangible storage devices, and program instructions stored on at least one of the one or more storage devices for execution by at least one of the one or more processors via at least one of the one or more memories.

In embodiments of the computer system, the program instructions comprise program instructions to receive a limited dataset and a rich dataset, wherein the limited dataset details one or more limited features, and wherein the rich dataset details the one or more limited features and at least one additional feature. In addition, the computer system further comprises program instructions to determine one or more first feature estimators corresponding to the one or more limited features based on the limited dataset and one or more second feature estimators corresponding to the one or more limited features and the at least one additional feature based on the richer dataset.

In embodiments, the computer system may further includes program instructions to update the one or more first feature estimators based on the one or more second feature estimators, program instructions to evaluate the one or more updated first feature estimators with regard to a target insight, and program instructions to provide a feature collection recommendation based on the evaluation.

According to some embodiments, the program instructions to evaluate the updated one or more first feature estimators further comprise program instructions to determine a first effect on the target insight based on applying the one or more first feature estimators to the limited dataset, program instructions to determine a second effect on the target insight based on applying the one or more second feature estimators to the limited dataset, and program instructions to compare the first effect on the target insight to the second effect on the target insight.

In other embodiments, the computer system further includes program instructions to determine that the limited dataset lacks a corresponding value to apply the one or more second feature estimators, program instructions to impute the corresponding value; and program instructions to apply the model having the one or more second feature estimators to the limited dataset.

In some embodiments, the feature collection recommendation includes at least one of one or more of the at least one additional feature for inclusion in the limited dataset, and an amount of data to be collected corresponding to the one or more of the at least one additional feature. In further embodiments, the feature collection recommendation further includes the second effect on the target insight.

According to another embodiment, the program instructions to receive the limited dataset and the rich dataset further comprise program instructions to determine a population relatedness between the limited dataset and one or more candidate richer datasets, and program instructions to receive a selection of the rich dataset of the one or more candidate richer datasets.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
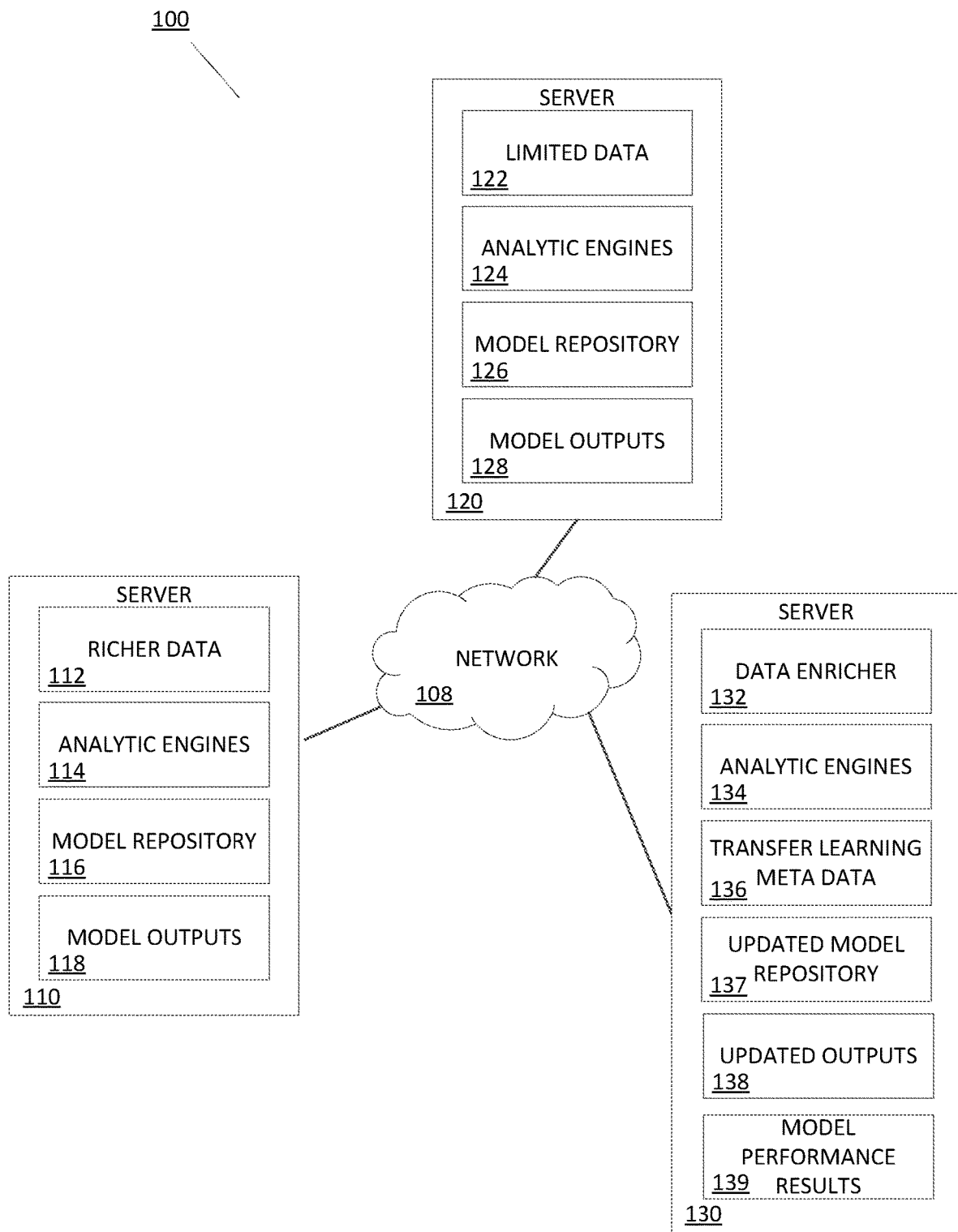
FIG. 1 depicts a schematic diagram of a data enriching system 100, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

As previously mentioned, healthcare data is typically collected to serve certain purpose, and thus only features relevant to the purpose are collected. Moreover, collecting these additional features can be expensive and require new machine and/or employee training to collect new information, or changes to the data collection process, for example changing data collection protocol, database architecture, storage space, etc. Thus, to collect features in additional to those already in a data set, one needs to be sure that the benefit is greater than the cost.

Suppose in addition to the data set having limited features, known as the limited data set, there is another data set having more features, known as a richer data set. The richer data can aid in the analysis of the limited data in multiple aspects as a gold standard. The richer data can help one to evaluate which additional features should be collected and the amount of additional data to collect to better serve the purpose. Also, based on many transfer learning methods, richer data can calibrate analytic outputs from the limited data to improve accuracy/confidence.

Many statistical methods that transfer statistical learning from a richer dataset to a limited dataset have been developed. The details vary greatly based on analysis goal, population heterogeneity, data pooling availability, etc.; and among methods for similar conditions, many different ideas have been proposed. Considering there is no universal method, one needs to test many methods to find one that performs the best for the limited data and the problem-at-hand.

The proposed invention is an analytics system that utilizes information from richer data to analyse limited data. Specifically, it focuses on using the richer data to calibrate analytical outputs from limited data and guide future data collection for the limited data.

A data enriching system 100 in accordance with an embodiment of the invention is illustrated by FIG. 1. In the example embodiment, data enriching system 100 includes server 110, server 120, and server 130. While, in the example embodiment, data and programming of the present invention are stored remotely across multiple servers within a network, in other embodiments, data and programming of the present invention may be contained on a single computing device locally.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between server 110, server 120, and server 130.

Server 110 includes richer data 112, analytics engine 114, model repository 116, and model outputs 118. In the example embodiment, server 110 is a computing device that may be a server, a laptop computer, a notebook, a tablet computer, a netbook computer, a personal computer (PC), a desktop computer, a personal digital assistant (PDA), a touchtone phone, a smart phone, a mobile phone, a virtual device, a thin client, or any other electronic device or computing system capable of receiving and sending data to and from other computing devices. While server 110 is shown as a single device, in other embodiments, server 110 may be comprised of a cluster or plurality of computing devices, working together or working separately. Server 110 is described in more detail with reference to FIG. 5.

Richer data 112 is a collection of information contained in files, folders, and other document types that have many features, or discernible characteristics. In the example embodiment, richer data 112 may be a corpora of documents which detail bodies of categorized and subject specific data, such as medical, legal, and financial data. In other embodiments, richer data 112 may include uncategorized data of miscellaneous topics. In the example embodiment, however, richer data 112 details patient medical information such as patient gender, age, location, health conditions, etc. in the form of electronic medical records (EMRs). Such information may be structured (i.e. have associated metadata), partially structured, or unstructured. Moreover, data within richer data 112 may be written in programming languages of common file formats such as .docx, .doc, .pdf, .rtf, .jpg, .csv, .txt, etc. In further embodiments, richer data 112 may include handwritten and other documents scanned or otherwise converted into electronic form. Richer data 112 is described in greater detail with respect to FIGS. 2-4.

Analytics engines 114 are computer software and/or hardware modules that analyse the data stored in richer data 112. In the example embodiment, analytics engines 114 are utilized to perform statistical operations, such as determining a percentage, mean, standard deviation, range distribution, etc., as well as perform more complex operations such as predictive modelling and effectiveness evaluation. Analytics engines 114 are described in greater detail with reference to FIGS. 2-4.

Model repository 116 is a collection of data detailing one or more models that are used to analyse the data stored in richer data 112. In the example embodiment, model repository 116 contains models that use the features and estimators of richer data 112. Moreover, such models may output values such as predictions of future events and effectiveness of medications. In the example embodiment, models in model repository 116, and more specifically features and estimators thereof, are used to calibrate and enrich limited data. Model repository 116 is described in greater detail with respect to FIGS. 2-4.

Model outputs 118 are a collection of data detailing outputs from the models contained in model repository 116.

In the example embodiment, data in model outputs 118 includes the output values that result from applying the models contained in model repository 116 to the data in richer data 112. Moreover, such values may relate to predictions of future events and effectiveness of medications. Model outputs 118 are described in greater detail with respect to FIGS. 2-4.

Server 120 includes limited data 122, analytics engine 124, model repository 126, and model outputs 128. In the example embodiment, server 120 is a computing device that may be a server, a laptop computer, a notebook, a tablet computer, a netbook computer, a personal computer (PC), a desktop computer, a personal digital assistant (PDA), a touchtone phone, a smart phone, a mobile phone, a virtual device, a thin client, or any other electronic device or computing system capable of receiving and sending data to and from other computing devices. While server 120 is shown as a single device, in other embodiments, server 120 may be comprised of a cluster or plurality of computing devices, working together or working separately. Server 120 is described in more detail with reference to FIG. 5.

Limited data 122 is a collection of information contained in files, folders, and other document types that has less features, or discernible characteristics, than that of richer data 112. In the example embodiment, limited data 122 may be a corpora of documents which detail bodies of categorized and subject specific data, such as medical, legal, and financial data. In other embodiments, limited data 122 may include uncategorized data of miscellaneous topics. In the example embodiment, limited data 122 details patient medical information such as patient gender, age, location, health conditions, etc. in the form of electronic medical records (EMRs). Such information may be structured (i.e. have associated metadata), partially structured, or unstructured. Moreover, data within limited data 122 may be written in programming languages of common file formats such as .docx, .doc, .pdf, .rtf, .jpg, .csv, .txt, etc. In further embodiments, limited data 122 may include handwritten and other documents scanned or otherwise converted into electronic form. Limited data 122 is described in greater detail with respect to FIGS. 2-4.

Analytics engines 124 are computer software and/or hardware modules that analyse the data stored in limited data 122. In the example embodiment, analytics engines 124 are utilized to perform statistical operations, such as determining a percentage, mean, standard deviation, range distribution, etc., as well as perform more complex operations such as predictive modelling and effectiveness evaluation. Analytics engines 124 are described in greater detail with reference to FIGS. 2-4.

Model repository 126 is a collection of data detailing one or more models that are used to analyse the data stored in limited data 122. In the example embodiment, model repository 126 contains models that use the features and estimators of limited data 122. Moreover, such models may output values such as predictions of future events and effectiveness of medications. In the example embodiment, models in model repository 126, and more specifically features and estimators thereof, are calibrated and enriched by those of richer data 112, as is described in greater detail with respect to FIGS. 2-4.

Model outputs 128 are a collection of data detailing outputs from the models contained in model repository 126. In the example embodiment, data in model outputs 128 includes the output values that result from applying the models contained in model repository 126 to the data in limited data 122. Moreover, such values may relate to predictions of future events and effectiveness of medications. In the example embodiment, outputs contained in model outputs 128 are utilized in determining whether the data enrichment process described herein improves limited data 122 by using the data as a baseline pre-enrichment value from which post-enrichment values may be compared. Model outputs 128 are described in greater detail with respect to FIGS. 2-4.

Server 130 includes data enricher 132, analytics engines 134, transfer learning meta data 136, updated model repository 137, updated outputs 138, and model performance results 139. Server 130 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 130 is shown as a single device, in other embodiments, server 130 may be comprised of a cluster or plurality of computing devices, working together or working separately. Server 130 is described in more detail with reference to FIG. 5.

In some embodiments, server 130 may further comprise a user interface which allows a user of server 130 to interact with server 130 as well as other connected devices via network 108. In addition, the user interface may be connectively coupled to hardware components, such as those depicted by FIG. 5, for receiving user input, including mice, keyboards, touchscreens, microphones, cameras, and the like. In the example embodiment, the user interface may implemented via a web browsing application that contains a graphical user interface (GUI) and display that is capable of transferring data files, folders, audio, video, hyperlinks, compressed data, and other forms of data transfer individually or in bulk. In other embodiments, the user interface may be implemented via other integrated or standalone software applications and hardware capable of receiving user interaction and communicating with other electronic devices.

Data enricher 132 is a software program capable of enriching a limited data set based on a richer data set. More specifically, data enricher 132 is capable of receiving limited data 122 and a target insight. In addition, data enricher 132 is capable of identifying an applicable richer data 112 and determining a population relatedness between limited data 122 and the applicable richer data 112. Moreover, data enricher 132 is capable of calculating estimators of features using richer data 112 as well as calculating estimators for features using limited data 122. Data enricher 132 is additionally capable of updating estimators of limited data 122 using estimators of richer data 112 and evaluating the updated estimators. Lastly, data enricher 132 is capable of providing a data collection recommendation for limited data 122 based on the evaluation. The operations of data enricher 132 are described in greater detail with respect to FIGS. 2-4.

Analytics engines 134 are computer software and/or hardware modules that analyse data. In the example embodiment, analytics engines 134 are utilized to perform statistical operations, such as determining a percentage, mean, standard deviation, range distribution, etc., as well as perform more complex operations such as predictive modelling and effectiveness evaluation. Analytics engines 134 are described in greater detail with reference to FIGS. 2-4.

Transfer learning meta data 136 is a collection of data detailing transfer learning methods and techniques. In the example embodiment, transfer learning methods are used to enrich limited data 122 based on richer data 112. Meta data stored in transfer learning meta data 136 may vary by the goal of the analysis, but for example may include adjustment factors for effectiveness evaluation (shown in FIG. 4) or imputation rules for predictive models (shown in FIG. 3). In further embodiments, transfer learning meta data 136 may also include any hyper-parameter and transferring factor or techniques learned from richer data 112.

Updated model repository 137 is a collection of data detailing updated versions of the models contained in model repository 126. In the example embodiment, for instance, updated model repository 137 includes models contained in model repository 126 that have been updated in accordance with models contained in model repository 116. Moreover, updates to the models stored in updated model repository 137 may describe updates performed at a raw, coefficient, or output level based on analysis of limited data 122 in light of richer data 112.

Updated outputs 138 is a collection of data detailing the updated outputs of the updated models contained in updated model repository 137. In the example embodiment, data in updated outputs 138 is compared to model outputs 128 in order to determine whether updating the model(s) in model repository 126 has improved data analysis. Effectively, updated outputs 138 serves as a post-enrichment values from which to compare the pre-enrichment values of model outputs 128.

Model performance results 139 is a collection of data detailing a resultant change in performance between data outputs of model outputs 128 and data outputs of updated models in updated model repository 137. In the example embodiment, model performance results may relate to a particular result, what is known as a target insight, and may include, for example, model prediction accuracy as it relates to a particular event or medication effectiveness as it relates to a particular medication.

Figure 2:
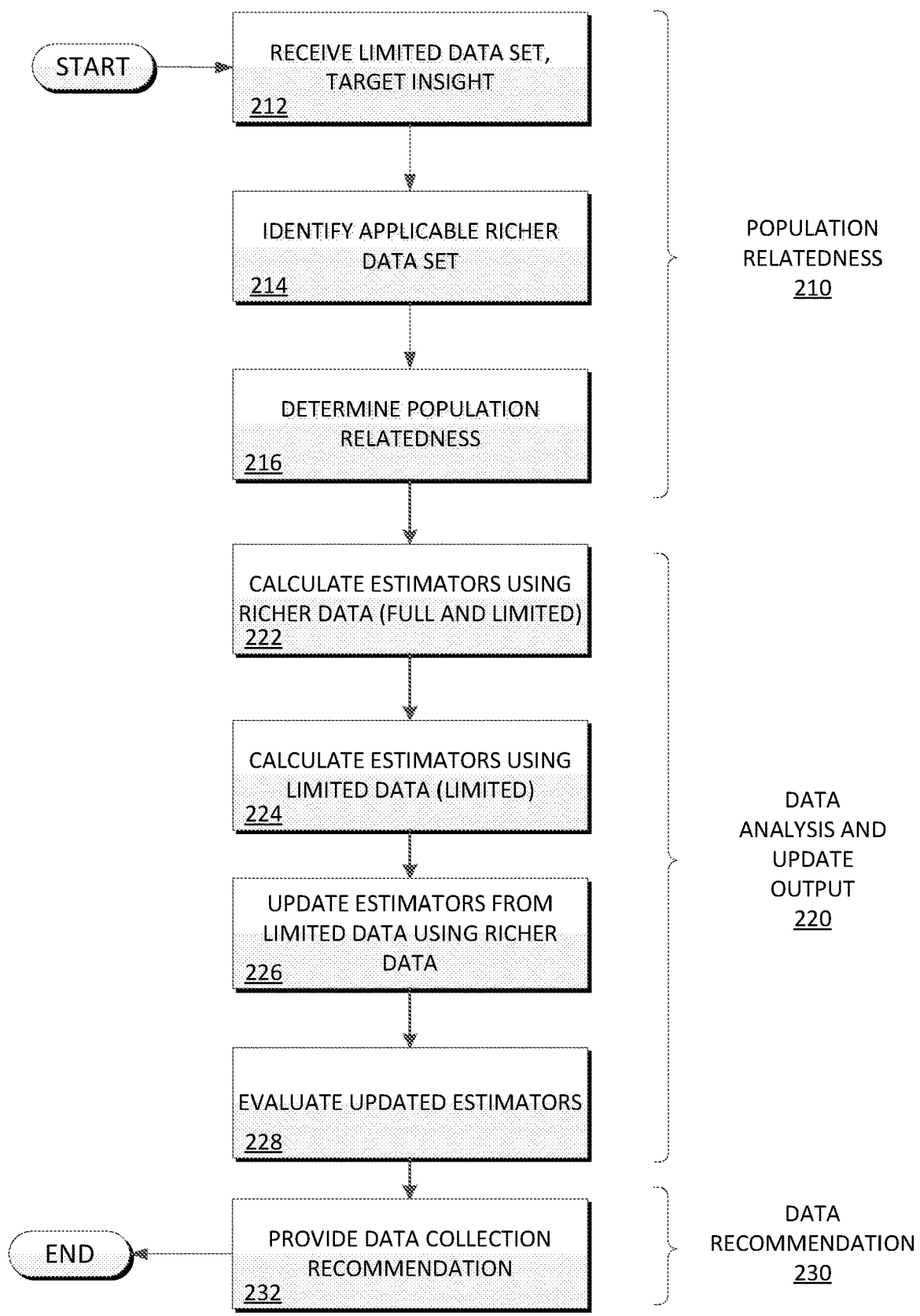
FIG. 2 depicts a flowchart illustrating the operations of data enricher 132 of data enriching system 100 in enriching limited data sets based on richer data sets, in accordance with an embodiment of the present invention.
Figure 3:
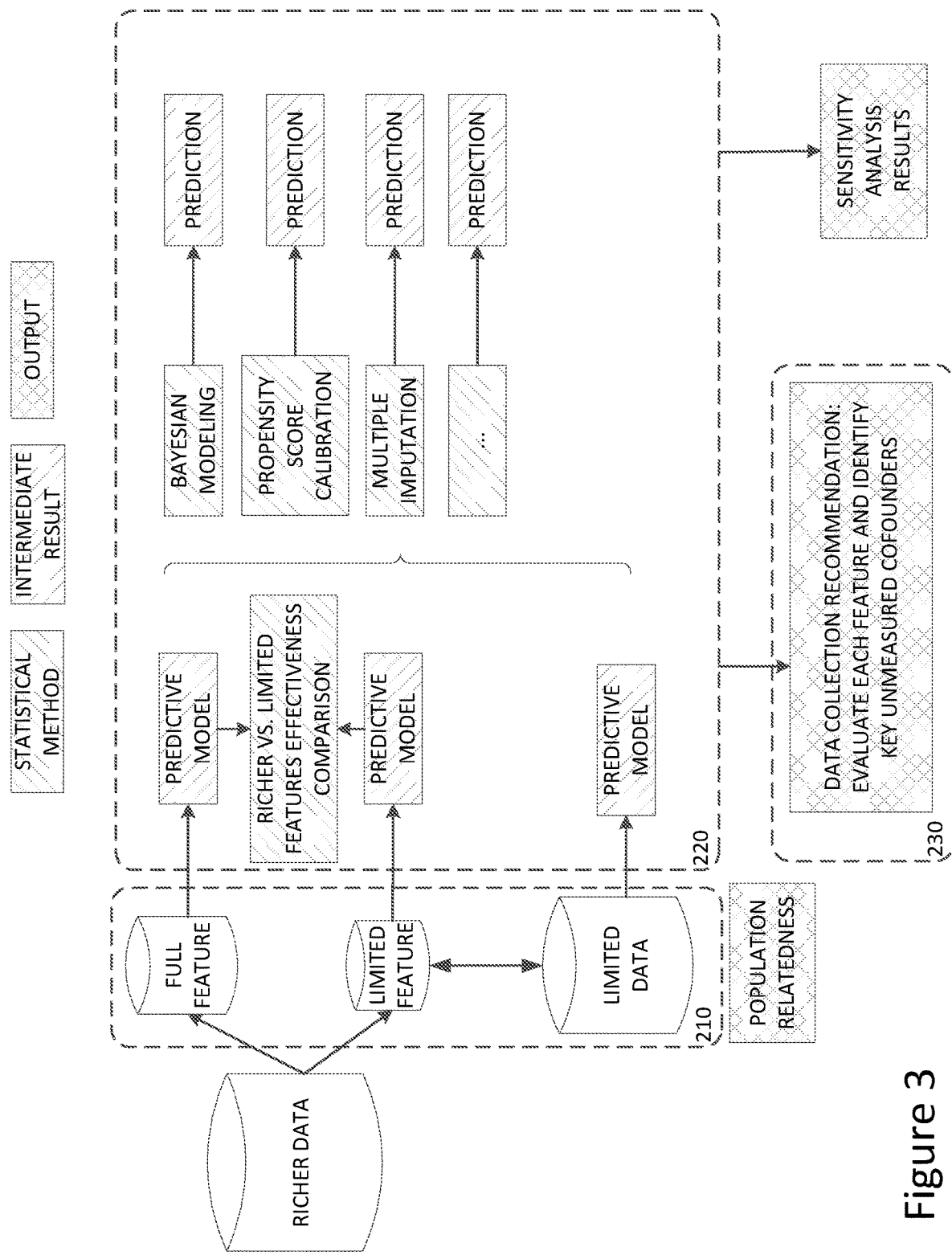
FIG. 3 depicts a schematic diagram illustrating of the operation of data enricher 132 in adjusting effectiveness evaluation of a limited data set based on a richer data set, in accordance with an embodiment of the present invention.
Figure 4:
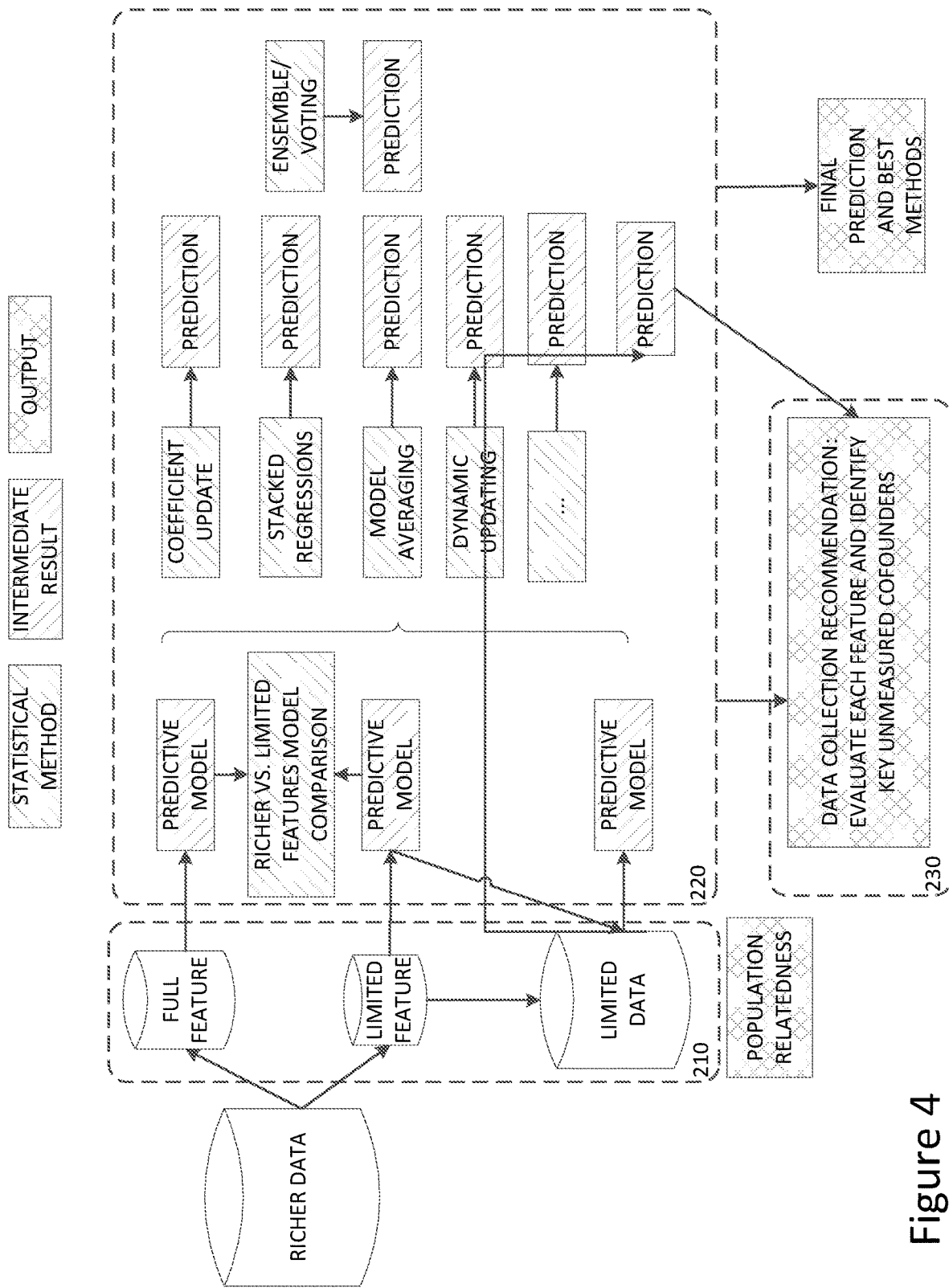
FIG. 4 depicts a schematic diagram illustrating the operation of data enricher 132 in updating a prediction based on the richer data, in accordance with an embodiment of the present invention.

FIG. 2 illustrates the operations of data enricher 132 in enriching limited data 122. More specifically, data enricher 132 enriches limited data 122 by determining which features that are lacking from limited data 122 would have a greatest impact on a particular output, referred to herein as a target insight, were the features included (or included in greater amounts) in limited data 122. For example, a target insight may be a feature having a greatest impact on the accuracy of a prediction model, or a feature having a greatest impact on medication effectiveness. In the example embodiment, data enricher 132 enriches limited data 122 based on analysis of richer data 112 and provides a data collection recommendation. In some embodiments, the data collection recommendation may include recommended feature(s) to collect that would result a greatest impact on the target insight, an amount of data corresponding to the recommended feature (s) needed for meaningful analysis of the target insight, and a predicted effect on the target insight if the recommended feature in the recommended amount were included in limited data 122. In the example embodiment, data enricher 132 operates in three modules (illustrated by FIGS. 2-4): population relatedness 210, data analysis and update output 220, and data collection recommendation 230. FIGS. 2-4 describe this process in greater detail.

Data enricher 132 determines a population relatedness between limited data 122 and richer data 112 at population relatedness 210. In the example embodiment, population relatedness 210 includes receiving a limited data set and target insight 212, identifying an applicable richer data set 214, and determining a population relatedness 216.

In the example embodiment, the process begins by data enricher 132 first identifying or receiving limited data 122 which lacks one or more features relevant to a target insight (step 212). The target insight, as used herein, may be any desired insight or outcome as it relates to analysis of limited data 122, for example an accuracy of predictions or effectiveness of medications that may deduced from limited data 122. To that point, if the target insight were, for instance improved model accuracy, data enricher 132 may determine that inclusion of data for a particular feature not currently represented or underrepresented in limited data 122 may result in a better accuracy of a corresponding model. Alternatively, for instance if the target insight were improving medication effectiveness, data enricher 132 may identify a feature not represented or underrepresented in limited data 122 that has a significant impact on the medication's effectiveness.

For example, data enricher 132 receives limited data 122 which details data of patients who have acquired type II diabetes. More specifically, limited data 122 includes data corresponding to the four features of gender, age, body mass index (BMI), and cholesterol. In addition, data enricher 132 receives a target insight as it relates to the analysis of limited data 122, for example improving accuracy of a model predicting readmission of the patients detailed by limited data 122, or increasing medication effectiveness of a medication administered to the patients detailed by limited data 122.

Data enricher 132 identifies one or more applicable richer data 112 (step 214). In order to identify additional features that limited data 122 lacks, data enricher 132 may be configured to identify other data sets in a similar field, subfield, or domain to compare features included in the identified data set to those within limited data 122. If data enricher 132 determines that one or more data sets within the similar field or subfield contain additional features that limited data 122 lacks, then data enricher 132 identifies the additional features as potential features for inclusion in analysis of limited data 122. In other embodiments, additional features or richer data 112 may simply be user input. For instance, if new research suggests a particular feature is relevant to a target insight, data enricher 132 may receive the particular feature and search for richer data 112 that contains the particular feature in addition to the features of limited data 122. Alternatively, data enricher 132 may be linked to a particular richer data 112 from which additional features are to be identified. While in the example embodiment, richer data 112 must contain all features detailed by limited data 122, in some embodiments, only a certain percentage of the limited features must be present within richer data 112.

Consider the earlier-introduced example regarding limited data 122 detailing type II diabetes patient information that includes the features gender, age, BMI, and cholesterol. In this example, data enricher 132 identifies richer data 112 by searching data sets within the type II diabetes domain for data sets including the features gender, age, BMI, and cholesterol, as well as additional features, for example the features creatine level and blood pressure. Alternatively, data enricher 132 may receive creatine level as a feature via user input and search for data sets detailing type II diabetes patients which include the features gender, age, BMI, cholesterol, and creatine levels. In yet further embodiments, data enricher 132 may simply receive richer data 112 via user input which includes the desired features.

Having identified one or more applicable richer data 112, data enricher 132 determines a population relatedness for each feature in common between limited data 122 and the one or more richer data 112. In the example embodiment, the population relatedness serves to aid in determining which richer data 112 is most applicable to limited data 122, and thus which should be used to enrich it. Accordingly, the population relatedness is based on statistical measures such as a mean, standard deviation, range, etc. and, in some embodiments, composite scores thereof, such as a Mahalanobis distance. When needed, determining a population relatedness may further involve constructing a subpopulation from one or more richer data 112 such that a subpopulations of richer data 112 is more applicable to limited data 122. Such subpopulations may aggregate groups of individuals from one or more richer data sets so long as the data details the features required by limited data 122 as well as any additional features relevant to the target insight. Thus, in some embodiments, richer data 112 may comprise extracted data from one or more richer data 112.

In the example above, for instance, where limited data 122 details patients who have acquired type II diabetes and includes data for the features gender, age, BMI, and cholesterol, data enricher 132 computes summary statistics comparing each individual feature of gender, age, BMI, and cholesterol between limited data 122 and richer data 112. For example, data enricher 132 may determine that 60% of the data in limited data 122 may comprise of individuals between the ages of 50 and 60 while 30% of the data in richer data 112 comprise individuals between the ages of 50 and 60. This process is repeated for each feature in common of the respective data sets, and thus data enricher 132 determines a population relatedness for gender, BMI, and cholesterol as well.

In embodiments in which several richer data 112 are applicable to limited data 122, data enricher 132 may be configured to prompt selection of a particular richer data 112 or, alternatively, prompt selection of subpopulations corresponding to the one or more richer data 112. In such embodiments, each of richer data 112 may be compared to limited data 122 based on the computed summary statistics individually or in bulk. In further embodiments, data enricher 132 may be configured to rank the two or more richer data 112 based on a population relatedness prior to prompting a user selection. Such ranking may be based on an overall highest relatedness (i.e. an average of all features), or based on individual feature relatedness, for instance a feature most relevant to the target insight. In yet further embodiments, data enricher 132 may be configured to automatically select a most related richer data 112, for example if a feature deemed most relevant to the target insight exceeds a relatedness threshold.

In the example embodiment, data enricher 132 next proceeds to data analysis and update output 220, which further comprises calculating estimators using richer data 222, calculating estimators using limited data 224, updating estimators from the limited data using the richer data 226, and evaluating the updated estimators 228.

Having identified richer data 112, data enricher 132 calculates estimators for richer data 112 that denote an impact of a particular feature on the target insight (step 222). In the example embodiment, estimators relate to the models contained in model repository 116 for analysing richer data 112 and are applied in the form of a coefficient. Here, data enricher 132 determines the estimators for the features that are contained only in limited data 122 (limited features) as well as all of the features contained in richer data 112 (all features). More specifically, in this particular computation, data enricher 132 determines estimators for the limited and full feature sets using the data of richer data 112.

In the example above, for instance, data enricher 132 calculates estimators for the limited feature set of gender, age, BMI, and cholesterol using the data contained in richer data 112. For example, data enricher 132 determines estimators for gender, age, BMI, and cholesterol as 0.1, 0.2, 0.3, and 0.4, respectively. Next, data enricher 132 determines estimators for features of the full feature set detailed by richer data 112 in addition to the limited feature set of limited data 122. In the example above, for instance, in addition to determining the feature estimators of 0.1, 0.2, 0.3, and 0.4 for each of the above respective features, data enricher 132 determines an estimator of creatine level to be 0.5. If, in the example above, there were additional features related to a target insight, for example blood pressure, then data enricher 132 determines estimators for gender, age, BMI, and cholesterol, as well as blood pressure. Again, data enricher calculates the estimators above using the data included in richer data 112.

Data enricher 132 determines estimators for limited data 122 (step 224). Like the operations of the previous step in which data enricher 132 calculates estimators for richer data 112, data enricher 132 similarly calculates estimators for limited data 122 corresponding to models in model repository 126. In this iteration, however, data enricher 132 determines estimators for the features of limited data 122, or the limited feature set, using the data of limited data 122.

Continuing the example introduced earlier, data enricher 132 calculates estimators for the features gender, age, BMI, and cholesterol based on the data of limited data 122. For example, data enricher 132 determines estimators for the features gender, age, BMI, and cholesterol based on limited data 122 to be 0.05, 0.15, 0.25, and 0.35.

Data enricher 132 updates estimators corresponding to limited data 122 based on the estimators corresponding to richer data 112 (step 226). In the example embodiment, data enricher 132 updates estimators for each individual feature of models corresponding to limited data 122 one at a time to determine whether inclusion/calibration of the feature estimator results in an improved target insight (evaluation thereof described below). While in the example embodiment, updating the estimators comprises replacing the limited data 122 estimator for a particular feature with the richer data 112 estimator for the particular feature, in other embodiments, the estimators may be weighted, averaged, or manipulated otherwise. For example, in embodiments where data corresponding to a feature is already included in limited data 122 but the estimator for limited data 122 differs from that of richer data 112, data enricher 132 may substitute the limited data 122 estimator with the richer data 112 estimator, average the two, or calibrate the limited data 122 estimator otherwise. In other embodiments where the feature is not included in limited data 122, i.e. an estimator of 0, then data enricher 132 may create a feature estimator based on the estimator of richer data 112. In the example embodiment, data enricher 132 may update the estimator of a limited data 122 model for any feature in the full or limited feature sets, depending on configuration. In order to determine which features should have a corresponding estimator updated, data enricher 132 updates estimators for each feature, both limited and full, using the updating techniques above until a greatest impact on the target insight is achieved. In some embodiments, achieving a greatest impact on the target insight may require the updating of only one feature estimator, while in other embodiments, may require the updating of multiple feature estimators. Thus, in addition to determining estimator sets for richer data 112 and limited data 122 in steps 222 and 224, data enricher 132 performs the process described herein to identify one or more sets of estimators, for example combinations of the richer data 112 estimators and limited data 122 estimators, in order to fine tune models corresponding to limited data 122. Such estimator sets are then evaluated in the next step to compute outputs that are stored in updated outputs 138. Based on the model outputs stored in updated outputs 138, data enricher 132 then determines model performance results, as will be described with greater detail below, and if the results significantly impact the target insight, data enricher 132 stores the estimator sets in updated model repository 137.

In the example above, for instance, data enricher 132 replaces the estimators of gender, age, BMI, cholesterol, and creatine of limited data 122 with the corresponding estimators of richer data 112. Thus, data enricher 132 replaces the estimator 0.05 with 0.1 for gender, 0.15 with 0.2 for age, 0.25 with 0.3 for BMI, and 0.35 with 0.4 for cholesterol. Alternatively, data enricher 132 may update feature estimators corresponding to limited data 122 models by averaging or weighting the estimators for each of richer data 112 and limited data 122. In some embodiments of the example, data enricher 132 may only update estimators for age and gender in a manner similar to that above. In addition, data enricher 132 updates a limited data 122 creatine level estimator of 0 with 0.5. If, for example, blood pressure were also included as an additional feature, then data enricher 132 may also update an estimator for blood pressure in a similar manner. In general, data enricher 132 may update any combination of feature estimators included in models corresponding to limited data 122 such that a target insight is impacted.

Data enricher 132 evaluates the updated estimators (step 228). In the example embodiment, data enricher 132 evaluates the updated estimators by comparing the target insight prior to and post inclusion/calibration of the one or more features. More specifically, data enricher 132 compares data in model outputs 128 to similar outputs in updated outputs 138. For example, if the target insight is model prediction accuracy, data enricher 132 compares a model prediction accuracy prior to inclusion/calibration of feature estimators in the model to model prediction accuracy after inclusion/calibration of the feature estimators in the model. Similarly, if the target insight is drug effectiveness, data enricher 132 compares a drug effectiveness prior to inclusion of the feature estimators in the model to a drug effectiveness post inclusion of the feature estimators in the model. In some embodiments where limited data 122 does not contain data corresponding to an additional feature, data enricher 132 may be configured to deduce/infer/impute values for use in evaluating the updated estimators. In this way, data enricher 132 may still evaluate the target insight using an updated estimator even when the analysis suggests that data corresponding to an important feature has not yet been collected. In the example embodiment, data enricher 132 infers values by identifying associations between other features. For example, a particular feature may be deduced from mathematical manipulation of other features. Alternatively, data enricher 132 may be configured to identify ballpark values from similarly situated data, for example patients of similar age and medical history. While in the example embodiment, evaluating each feature estimator is performed one feature at a time, in other embodiments, this process may be performed at once or in parallel.

Features having a greatest impact on the target insight are noted as being a most suitable candidate for inclusion in future data collection, as will be described below (228 continued). In the example embodiment, evaluating the updated estimators may be performed through cross-validation by, for example, breaking down historical data into training data and test data, then training the model based on the training data and verifying the model based on the test data. For example, data enricher 132 may build a model based on ninety percent of historical data and test the model on the remaining ten percent of the historical data for accuracy. This process is repeated for evaluation of each feature estimator updated in the limited feature set, one by one, until the most impactful features as they relate to the target insight are identified. Notably, the results of the evaluation herein may serve as an indicator as to what target insights to expect should the data of a particular and lacking feature be included in limited data 122. Therefore, in some embodiments, data enricher 132 may perform predictive modelling and output predicted target insight values for limited data 122 based on richer data 112.

In the example above, for instance, data enricher 132 may determine that based on the data in limited data 122, a model contained in model repository 126 using non-updated estimators can predict readmission of the type II diabetes patient with 62% accuracy. By incorporating one or more estimators for the features age and creatine (and in some embodiments deducing normal creatine levels), however, data enricher 132 may improve predictions of death by 68%. Similarly, updating an estimator for blood pressure may further increase model prediction accuracy to 73%. This process may be performed for every updated feature and updated feature set until a best combination and value of feature estimators are identified. The combinations and values of the feature estimators resulting in a greatest target insight are then stored in updated model repository 137 and the outputs are stored in updated outputs 138.

Data enricher 132 provides a data collection recommendation (step 232). Depending on the analysis requested, data enricher 132 may make one of many recommendations as it relates to a target insight, including one or more features to include in future data collection, an amount of data corresponding to the one or more recommended features needed to obtain meaningful results, and predictions as to what the result may be were the data/features included in limited data 122. If, for example, collecting data for additional features results in a greatest impact on the target insight, then data enricher 132 recommends collecting data for that feature. If, for example, collecting more data for a particular feature results in a greatest impact on the target insight, then data enricher 132 recommends collecting more data for that feature. Moreover, data enricher 132 predicts an impact on the target insight based on the evaluation of the updated estimators.

In the example above, for instance, data enricher 132 may first recommend collecting data as it relates to the feature blood pressure, as it resulted in a highest accuracy of predicting readmission. Moreover, data enricher 132 may suggest collecting age data for 100 more patients in order to improve the target insight, in this case prediction accuracy. In addition, data enricher 132 may determine that incorporating the blood pressure data for 100 patients into limited data 122 would result in a readmission prediction rate increase up to 73%.

FIG. 3 depicts a schematic diagram illustrating of the operation of data enricher 132 in adjusting effectiveness evaluation of a limited data set based on a richer data set, in accordance with an embodiment of the present invention. In addition, FIG. 3 depicts the modules comprising data enriching system 100, namely population relatedness 210, data analysis and update output 220, and data collection recommendation 230, as well as the operation of data enricher 132.

FIG. 4 depicts a schematic diagram illustrating the operation of data enricher 132 in updating a prediction based on the richer data, in accordance with an embodiment of the present invention. In addition, FIG. 4 depicts the modules comprising data enriching system 100, namely population relatedness 210, data analysis and update output 220, and data collection recommendation 230, as well as the operation of data enricher 132.

Figure 5:
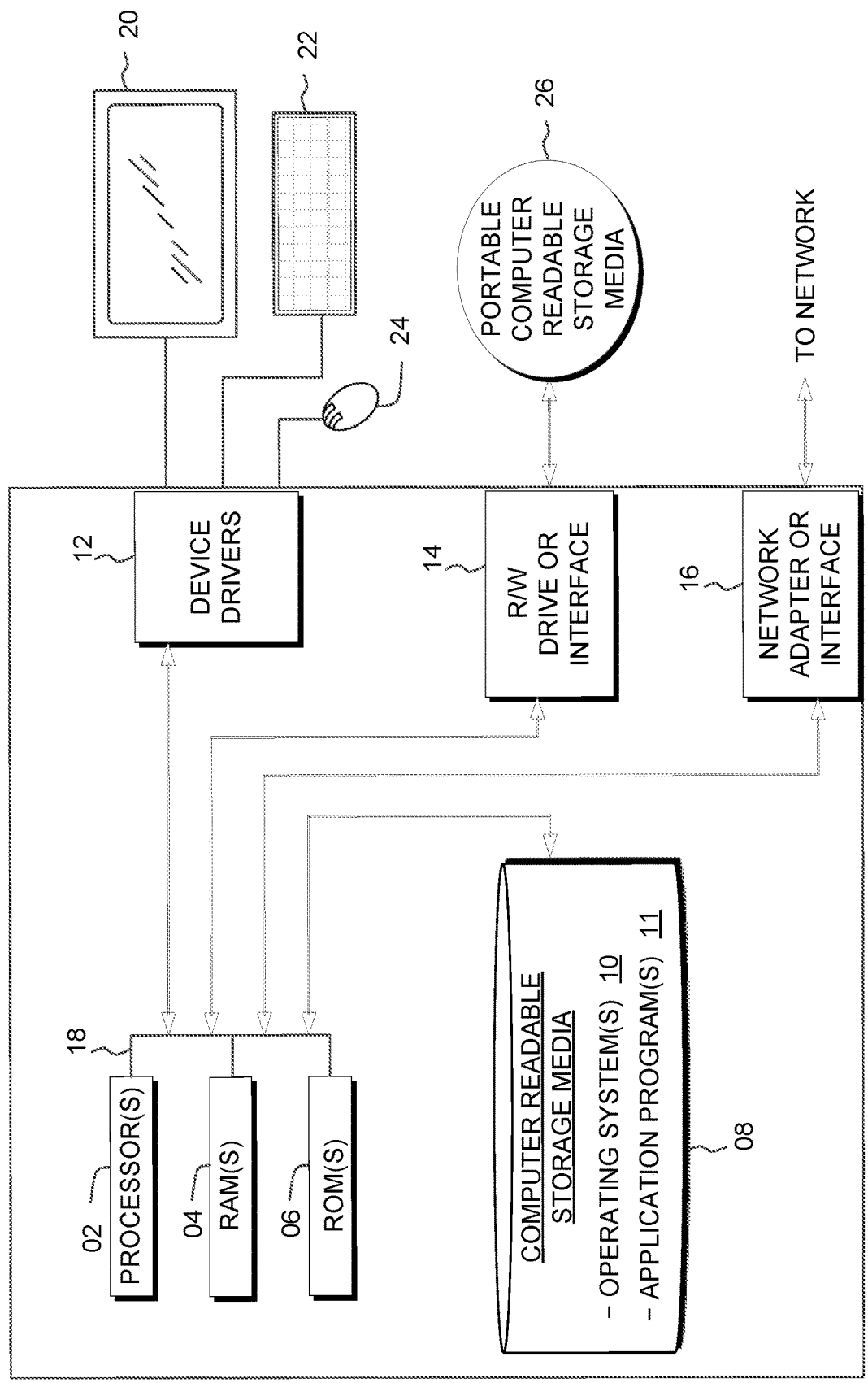
FIG. 5 is a block diagram depicting the hardware components of data enriching system 100 of FIG. 1, in accordance with an embodiment of the present invention.

FIG. 5 depicts a block diagram of computing device 110, server 120, and/or server 130 of the data enriching system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example data enricher 132, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
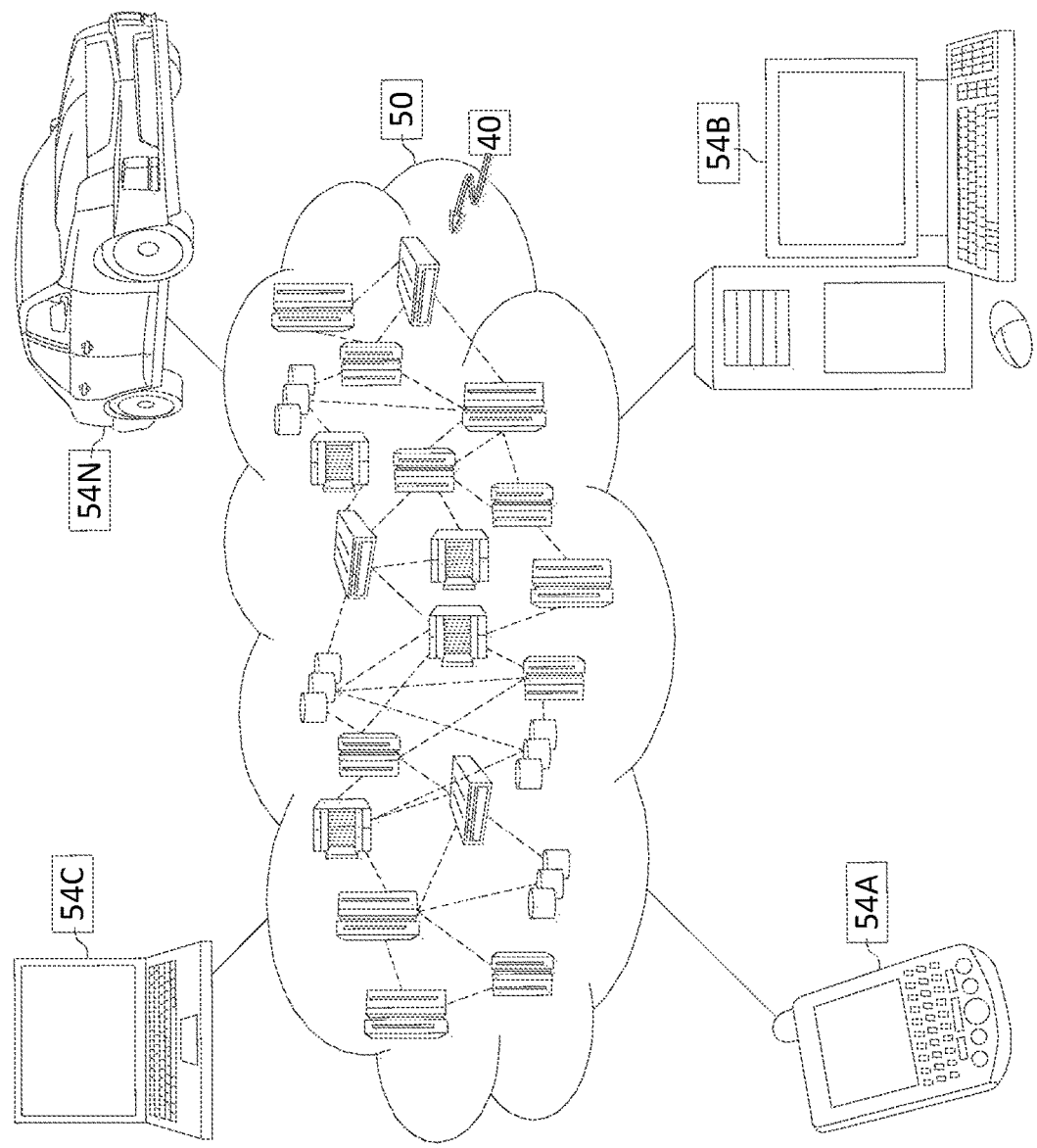
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
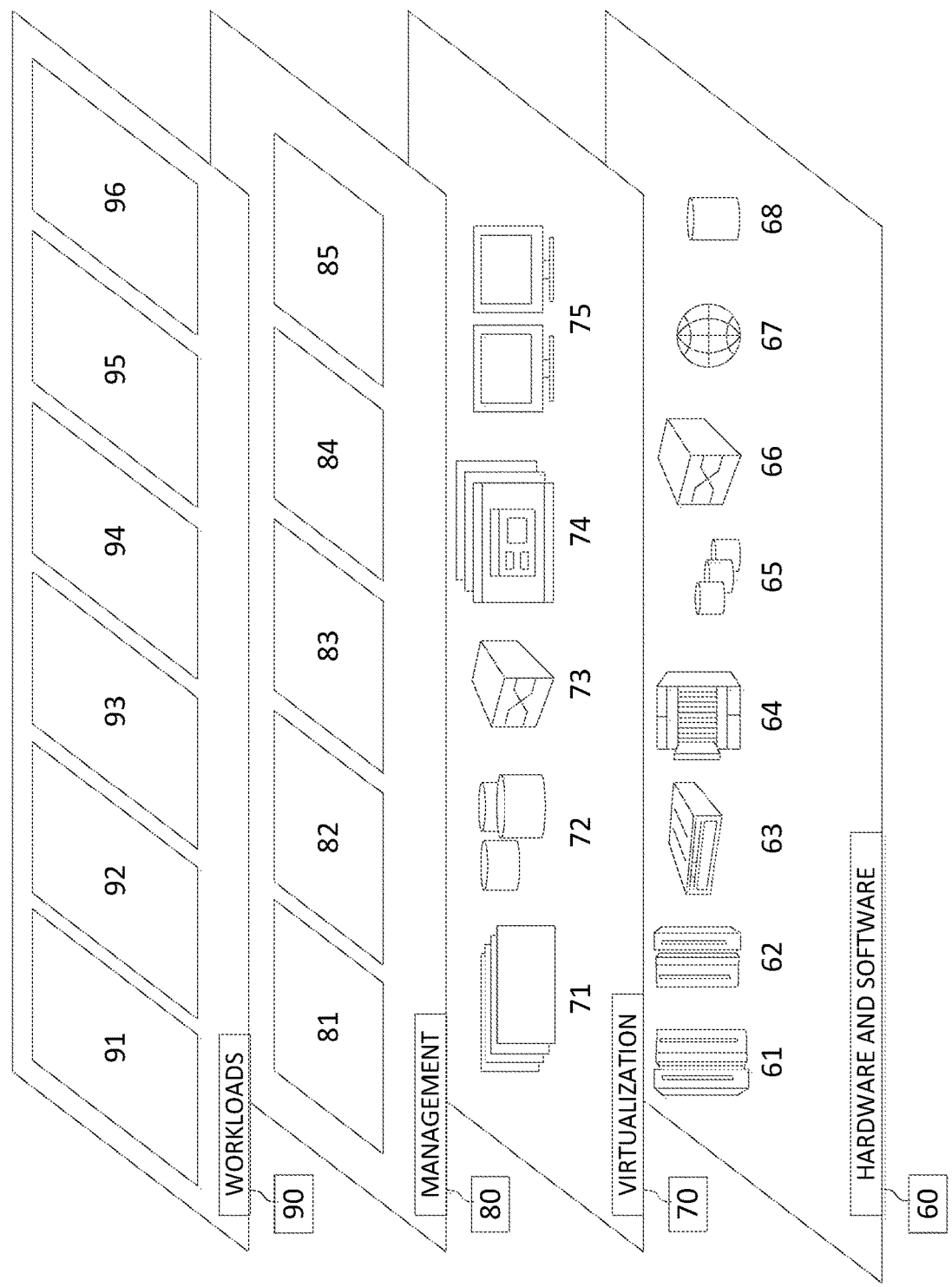
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and medication decision support processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for enriching data, the method comprising:
a computer receiving a limited dataset and a rich dataset, wherein the limited dataset includes one or more limited features, and wherein the rich dataset includes the one or more limited features and at least one additional feature;
the computer determining one or more first coefficients corresponding to the one or more limited features based on the limited dataset, wherein the one or more first coefficients denote an effect of the one or more first features on an output of a first model;
the computer determining one or more second coefficients corresponding to the one or more limited features and the at least one additional feature based on the richer dataset, wherein the one or more second coefficients denote an effect of the one or more second features on an output of a second model;
the computer updating the one or more first coefficients based on the one or more second coefficients;

the computer determining whether the updated one or more first coefficients improve the output of the first model; and based on the one or more updated first coefficients improving the output of the first model, the computer providing a feature collection recommendation based on the evaluation.

2. The method of claim 1, wherein evaluating the updated one or more first coefficients further comprises:
the computer determining a first effect on the target insight based on applying a model having the one or more first coefficients to the limited dataset;
the computer determining a second effect on the target insight based on applying a model having the one or more second coefficients to the limited dataset; and
the computer comparing the first effect on the target insight to the second effect on the target insight.

3. The method of claim 2, further comprising:
the computer determining that the limited dataset lacks a corresponding value to apply the model having the one or more second coefficients;
the computer imputing the corresponding value; and
the computer applying the model having the one or more second coefficients to the limited dataset.

4. The method of claim 1, wherein the feature collection recommendation includes at least one of:
one or more of the at least one additional feature for inclusion in the limited dataset; and
an amount of data to be collected corresponding to the one or more of the at least one additional feature.

5. The method of claim 2, wherein the feature collection recommendation further includes:
the second effect on the target insight.

6. The method of claim 1, wherein receiving the limited dataset and the rich dataset further comprises:
the computer determining a population relatedness between the limited dataset and one or more candidate richer datasets; and
the computer receiving a selection of the rich dataset of the one or more candidate richer datasets.

7. The method of claim 1, wherein updating the one or more first coefficients based on the one or more second coefficients further comprises at least one of:
the computer replacing the one or more first coefficients with the one or more second coefficients;
the computer replacing the one or more first coefficients based on an average of the one or more first coefficients and the one or more second coefficients; and
the computer replacing the one or more first coefficients based on a weighted average of the one or more first coefficients and the one or more second coefficients.

8. A computer program product for enriching data, the computer program product comprising:
one or more computer-readable storage devices and program instructions stored on at least one of the one or more tangible storage devices, the program instructions comprising:
program instructions to receive a limited dataset and a rich dataset, wherein the limited dataset includes one or more limited features, and wherein the rich dataset includes the one or more limited features and at least one additional feature;
program instructions to determine one or more first coefficients corresponding to the one or more limited features based on the limited dataset, wherein the one or more first coefficients denote an effect of the one or more first features on an output of a first model;
program instructions to determine one or more second coefficients corresponding to the one or more limited features and the at least one additional feature based on the richer dataset, wherein the one or more second coefficients denote an effect of the one or more second features on an output of a second model;
program instructions to update the one or more first coefficients based on the one or more second coefficients;
program instructions to determine whether the one or more updated first coefficients improve the output of the first model; and
based on the one or more updated first coefficients improving the output of the first model, program instructions to provide a feature collection recommendation based on the evaluation.

9. The computer program product of claim 8, wherein the program instructions to evaluate the updated one or more first coefficients further comprise:
program instructions to determine a first effect on the target insight based on applying the one or more first coefficients to the limited dataset;
program instructions to determine a second effect on the target insight based on applying the one or more second coefficients to the limited dataset; and
program instructions to compare the first effect on the target insight to the second effect on the target insight.

10. The computer program product of claim 9, further comprising:
program instructions to determine that the limited dataset lacks a corresponding value to apply the one or more second coefficients;
program instructions to impute the corresponding value; and
program instructions to apply the model having the one or more second coefficients to the limited dataset.

11. The computer program product of claim 8, wherein the feature collection recommendation includes at least one of:
one or more of the at least one additional feature for inclusion in the limited dataset; and
an amount of data to be collected corresponding to the one or more of the at least one additional feature.

12. The computer program product of claim 9, wherein the feature collection recommendation further includes:
the second effect on the target insight.

13. The computer program product of claim 8, wherein the program instructions to receive the limited dataset and the rich dataset further comprise:
program instructions to determine a population relatedness between the limited dataset and one or more candidate richer datasets; and
program instructions to receive a selection of the rich dataset of the one or more candidate richer datasets.

14. The computer program product of claim 8, wherein the program instructions to update the one or more first coefficients based on the one or more second coefficients further comprise at least one of:
program instructions to replace the one or more first coefficients with the one or more second coefficients;
program instructions to replace the one or more first coefficients based on an average of the one or more first coefficients and the one or more second coefficients; and
program instructions to replace the one or more first coefficients based on a weighted average of the one or more first coefficients and the one or more second coefficients.

15. A computer system for enriching data, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive a limited dataset and a rich dataset, wherein the limited dataset includes one or more limited features, and wherein the rich dataset includes the one or more limited features and at least one additional feature;
program instructions to determine one or more first coefficients corresponding to the one or more limited features based on the limited dataset, wherein the one or more first coefficients denote an effect of the one or more first features on an output of a first model;
program instructions to determine one or more second coefficients corresponding to the one or more limited features and the at least one additional feature based on the richer dataset, wherein the one or more second coefficients denote an effect of the one or more second features on an output of a second model;
program instructions to update the one or more first coefficients based on the one or more second coefficients;
program instructions to determine whether the one or more updated first coefficients improve the output of the first model; and
based on the one or more updated first coefficients improving the output of the first model, program instructions to provide a feature collection recommendation based on the evaluation.

16. The computer system of claim 15, wherein the program instructions to evaluate the updated one or more first coefficients further comprise:
program instructions to determine a first effect on the target insight based on applying the one or more first coefficients to the limited dataset;
program instructions to determine a second effect on the target insight based on applying the one or more second coefficients to the limited dataset; and
program instructions to compare the first effect on the target insight to the second effect on the target insight.

17. The computer system of claim 16, further comprising:
program instructions to determine that the limited dataset lacks a corresponding value to apply the one or more second coefficients;
program instructions to impute the corresponding value; and
program instructions to apply the model having the one or more second coefficients to the limited dataset.

18. The computer system of claim 15, wherein the feature collection recommendation includes at least one of:
one or more of the at least one additional feature for inclusion in the limited dataset; and
an amount of data to be collected corresponding to the one or more of the at least one additional feature.

19. The computer system of claim 16, wherein the feature collection recommendation further includes:
the second effect on the target insight.

20. The computer system of claim 15, wherein the program instructions to receive the limited dataset and the rich dataset further comprise:
program instructions to determine a population relatedness between the limited dataset and one or more candidate richer datasets; and
program instructions to receive a selection of the rich dataset of the one or more candidate richer datasets.

* * * * *